(12) United States Patent
Gichuhi et al.

(10) Patent No.: US 7,481,877 B2
(45) Date of Patent: Jan. 27, 2009

(54) SYNERGISTIC CORROSION INHIBITOR

(75) Inventors: Tony Gichuhi, Hobart, IN (US); Wendy Novelli, Schererville, IN (US)

(73) Assignee: Hammond Group, Inc., Hammond, IN (US)

( * ) Notice: Subject to any disclaimer, the term of this patent is extended or adjusted under 35 U.S.C. 154(b) by 633 days.

(21) Appl. No.: 10/832,139

(22) Filed: Apr. 26, 2004

(65) Prior Publication Data

US 2005/0235873 A1  Oct. 27, 2005

(51) Int. Cl.
*C04B 14/04* (2006.01)

(52) U.S. Cl. .................. 106/481; 106/14.05; 106/14.11; 106/14.2; 106/14.3; 106/14.14; 106/14.15; 106/14.21; 428/472

(58) Field of Classification Search .......... 106/481, 106/14.05, 14.11, 14.2, 14.3, 14.14, 14.15, 106/14.21; 428/472
See application file for complete search history.

(56) References Cited

U.S. PATENT DOCUMENTS

| 4,284,762 | A | 8/1981 | Miyata et al. |
|---|---|---|---|
| 4,347,353 | A | 8/1982 | Miyata et al. |
| 4,675,356 | A | 6/1987 | Miyata |
| 4,761,188 | A | 8/1988 | Miyata |
| 4,842,645 | A | 6/1989 | Miyata et al. |
| H856 | H | 12/1990 | Kutik et al. |
| 5,055,199 | A | 10/1991 | O'Neill et al. |
| 5,068,095 | A | 11/1991 | Nigro et al. |
| 5,179,063 | A | 1/1993 | Harris et al. |
| 5,266,356 | A | 11/1993 | Buchheit, Jr. et al. |
| 5,378,367 | A | 1/1995 | O'Neill et al. |
| RE35,576 | E | 7/1997 | Buchheit, Jr. et al. |
| 5,941,037 | A | 8/1999 | Hallock et al. |
| 6,313,208 | B1 | 11/2001 | Nosu et al. |
| 6,451,443 | B1 | 9/2002 | Daech |
| 6,503,305 | B1 * | 1/2003 | Hodges et al. ........... 106/14.12 |
| 6,509,405 | B1 | 1/2003 | Kobayashi et al. |
| 6,838,506 | B2 * | 1/2005 | Nakao et al. ................ 524/436 |
| 2003/0139511 | A1 | 7/2003 | Kobayashi et al. |
| 2003/0158318 | A1 | 8/2003 | Nakao et al. |
| 2004/0062873 | A1 | 4/2004 | Jung et al. |
| 2004/0262580 | A1 * | 12/2004 | Yu et al. .................. 252/389.1 |

FOREIGN PATENT DOCUMENTS

| EP | 0150741 | 8/1985 |
|---|---|---|
| EP | 0282619 | 9/1988 |
| EP | 1 479 736 A1 | 11/2004 |
| GB | 2252324 | 8/1992 |
| JP | 198560152574 | 8/1985 |
| JP | 119902211612 | 8/1990 |
| JP | 19979313928 | 12/1997 |
| JP | 200129165 | 5/2000 |
| JP | 2002194152 | 7/2002 |
| JP | 2002285002 | 10/2002 |
| WO | WO 03/102085 | * 5/2003 |

OTHER PUBLICATIONS

European Patent Office Communication and Partial Search Report issued in EP application No. 05102915.5-2109, dated Aug. 30, 2006.
European Patent Office Communication and Search Report issued in EP application No. 05102915.5-2109, dated Jan. 10, 2007.

* cited by examiner

*Primary Examiner*—J. A. Lorengo
*Assistant Examiner*—Pegah Parvini
(74) *Attorney, Agent, or Firm*—Patula & Associates, P.C.

(57) ABSTRACT

A non-toxic corrosion inhibitor and method comprising hydrotalcite or a hydrotalcite-like complexing agent and one or a combination of an organic or inorganic corrosion inhibitive complexing agent, provides improved corrosion protection on metal substrates and utilizes synergistic corrosion inhibitive mechanisms.

23 Claims, No Drawings

SYNERGISTIC CORROSION INHIBITOR

The present invention relates generally to corrosion inhibitors, and in particular to an improved corrosion inhibitor which may be used as an additive in protective coatings to inhibit corrosion of ferrous and non-ferrous metal substrates. More specifically, the present invention is a non-toxic corrosion inhibitor comprising hydrotalcite or a hydrotalcite-like compound in combination with organic and/or inorganic corrosion inhibitors which employs synergistic corrosion inhibition mechanisms to significantly improve the corrosion resistance of a coating, enhance the effectiveness of any organic or inorganic corrosion inhibitor and when applied to corrodible metal substrates forms a corrosion-resistant barrier.

BACKGROUND OF THE INVENTION

Corrosion is an electrochemical process that takes place at the surface of a metal substrate when exposed to water, oxygen, and other corrosive elements causing the metal to deteriorate. Coating a metal substrate creates a barrier that helps reduce exposure to these deleterious elements, thus reducing the corrosion of the metal. However, if there is a defect or imperfection in the coating film, coating failure becomes imminent and corrosion ensues.

For many years, chromate-based chemistries have been the benchmark of corrosion inhibitors incorporated into coatings for providing corrosion protection for metal substrates. Due to the inherent toxicity of and strict environmental regulations concerning chromate-based corrosion inhibitors, paint manufacturers have been forced to replace these toxic chromate-based inhibitors with more benign alternatives. Although several non-toxic inhibitors are commercially available, including inorganic borates, phosphates, phosphites, ion exchange silicas, ferrites, titanates, vanadates, molybdates, zirconates, and organic inhibitors such as amines, phosphonates, and sulfonates, these inhibitors fail to meet the outstanding performance exhibited by chromate-based corrosion inhibitors.

Chromate-based corrosion inhibitors are particularly effective in thin film applications where the barrier effect of the coating, the protection provided by an impermeable film from a corrosive environment, is virtually non-existent. Corrosion protection must, therefore be provided by corrosion inhibitors in thin film applications. In thin film coatings (generally defined as those coatings between approximately 1-5 mils thick), for example, those used in coils, in aerospace and in powder coatings, corrosion protection is provided by the inhibitive action of a single corrosion inhibitor alone. Non-toxic inhibitors provide corrosion protection through anodic, cathodic, film formation, adsorption or precipitation mechanisms. Most non-toxic inhibitors utilize a single type of corrosion inhibiting mechanism. As a result, these non-toxic corrosion inhibitors fail to provide the same corrosion resistance as their toxic counterparts.

Film formation is a mechanism involving molecules whose structure contains a polar head-group and a non-polar tail group. The film is formed when the adhering head-group elements, for example, nitrogen, sulfur, silicon, or phosphorus, chemically bind to a polar metal surface while the tail group remains oriented away into the non-polar coating, thus providing an impermeable layer that restricts corrosive ions from reaching the substrate.

Chromate-based inhibitors are known for their great performance primarily because they act as mixed corrosion inhibitors, i.e., anodic and cathodic inhibitors. All corrosion reactions have an anodic and cathodic component. Anodic and cathodic corrosion inhibitors inhibit corrosion by shifting the electrochemical reaction potential of the substrate either more positive (anodic) or negative (cathodic). Thus, chromates can (a) prevent corrosion by passivating the substrate and shifting the substrate potential more positive (anodic), thus reducing the corrosion rate of the substrate and (b) by depositing insoluble hydroxide films, which shift the substrate potential more negative (cathodic), thus reducing the severity of metal corrosion.

An anodic inhibitor prevents the metal from going into solution as a metal cation as shown in Reaction 1.

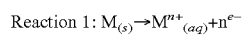

Reaction 1: $M_{(s)} \rightarrow M^{n+}_{(aq)} + n e^-$

Where $M_{(s)}$ is the metal, $M^{n+}$ is the metal ion going into the aqueous solution, and $n e^-$ is the number of electrons liberated in the process.

A stable product is formed at the surface, which prevents further dissolution. A cathodic inhibitor deposits a protective film on the substrate, which in turn prevents the reduction of oxygen (Reaction 2) and hydrogen (Reaction 3) at the surface.

Reaction 2: $O_2 + 2H_2O + 4e^- \rightarrow 4OH^-$ (2)

Reaction 3: $2H^+ + 2e^- \rightarrow H_2$ (3)

A cathodic inhibitor essentially shuts down the opposite reaction to the anodic process.

Unlike chromate-based corrosion inhibitors, most non-toxic inhibitors require solubility in the organic coating in order to be effective. Permeating water or moisture in the coating hydrolyzes these inhibitive non-toxic salt inhibitors (e.g. barium metaborate) in order to release the non-toxic inhibitor (e.g. borate ions), which provides the corrosion protection. Often, the higher solubility of non-toxic inhibitors compared to chromates contributes to problems such as osmotic blistering of the coating because soluble salts accumulate in the coating and promote the accumulation of moisture into the film, facilitating corrosion. Thus, osmotic blistering is a common problem associated with non-toxic corrosion inhibitors having higher solubility levels (e.g. borates) because such inhibitors may leach or dissolve too quickly into the coating, become too quickly consumed, and thus afford no long-term corrosion protection properties to the coating. The inhibitor of the present invention is only slightly soluble, and therefore significantly reduces the likelihood of osmotic blistering and provides long-term corrosion protection.

Also unlike chromate-based inhibitors, which are more ubiquitous, non-toxic inhibitors are generally more resin and substrate specific. They work well in some resin systems but not in others, varying with the resultant solubility. Chromate-based corrosion inhibitors are to a lesser extent substrate or resin specific and are very effective on ferrous and non-ferrous substrates. Consequently, while many of the commercially available non-toxic inhibitors provide some level of corrosion inhibition there is a definite need for non-toxic corrosion inhibitors having improved performance in order to achieve a similar level of performance as chromate-based corrosion inhibitors.

The present invention fulfills this need, and overcomes the disadvantages and/or shortcomings of known prior art metal substrate corrosion inhibitors and provides a significant improvement thereover. Thus, the present invention provides an improved non-toxic corrosion inhibitor by utilizing multiple inhibitive mechanisms. Unlike the present invention, none of the known commercially available non-toxic inhibitors teach synergy as a means to produce more effective corrosion inhibitors.

SUMMARY OF THE INVENTION

A non-toxic corrosion inhibitor and method of preventing corrosion on metal substrates comprising a hydrotalcite or hydrotalcite-like compound and one or more organic or inorganic corrosion inhibitors is disclosed herein. The non-toxic corrosion inhibitor and method combines two or more inhibitive mechanisms into a single product in order to produce an effective non-toxic corrosion inhibitor that can provide improved corrosion resistance to metal substrates, especially in thin film coatings. The hydrotalcite and corrosion inhibitor composition may be used as an additive to a protective coating, such as paint, by incorporating it into conventional protective coatings, which when applied to a metal substrate, exhibits improved corrosion inhibiting properties of non-toxic corrosion inhibitors in protective coatings in general without requiring toxic chemical components such as chromates.

Accordingly, an object of the invention is to provide an effective and stable corrosion inhibitor comprising a mixture of hydrotalcite and at least one organic or inorganic corrosion inhibitor.

Another object of the invention is to provide a corrosion inhibitor that is non-toxic and environmentally friendly.

Another objective of the invention is to provide a corrosion inhibitor that will provide long-term corrosion protection.

Another object of the invention is to provide a corrosion inhibitor that can be incorporated into a water borne or solvent borne paint through conventional high-speed dispersion.

Another object of the invention is to provide a corrosion inhibitor that can be incorporated into a paint, such as but not limited to a primer, primer/topcoat, direct-to-metal, coil, automotive, aerospace or powder coating, which can be applied to a metal substrate, exhibiting improved corrosion resistant properties over prior corrosion inhibitor technologies.

Another object of the invention is to provide a corrosion inhibitor that is more effective at lower loading levels than prior corrosion inhibitors.

Another object of the invention is to provide a corrosion inhibitor that when incorporated into a paint, which is then applied to a metal substrate, will scavenge corrosive ions in the coating and release inhibitive ions, while maintaining passivation, or the formation of a corrosion-resistant layer, on the surface of a metal substrate.

Another object of the invention is to provide a corrosion inhibitor, which may be added to a paint for metal substrates, which mitigates corrosion by improving the impermeability of the coating toward moisture and corrosive ions.

Yet another object of the invention is to provide a corrosion inhibitor, which may be dispersed into a paint, which when applied to a metal substrate, forms a protective film resulting in reduced corrosion of the base metal, especially in thin film coatings.

Numerous other objects, features and advantages of the present invention will become readily apparent from the detailed description of the embodiments and from the claims.

DETAILED DESCRIPTION OF THE PREFERRED EMBODIMENT

While the invention is susceptible of embodiment in many different forms, there will be described herein in detail, preferred and alternate embodiments of the present invention. It should be understood, however, that the present disclosure is to be considered an exemplification of the principles of the invention and is not intended to limit the spirit and scope of the invention and/or claims of the embodiments illustrated.

The corrosion inhibitor described herein comprises a chemical composition of hydrotalcite or a hydrotalcite-like compound and a non-toxic corrosion inhibiting chemical compound, such as an organic and/or inorganic compound. The resulting chemical composition provides a non-toxic, effective and stable corrosion inhibitor. A hydrotalcite-like compound is a material that contains all the essential building elements making up hydrotalcite but lacks the structural functionality found in true hydrotalcite, which is only achieved through calcination (a process of heating a solid below its melting point in order to drive off water and form a stable oxide). The resultant corrosion inhibitor is a solid pigment and may be used in water-borne and/or solvent-borne paints, from which coatings may be applied to metal substrates to form a protective layer as an adherent film. The corrosion inhibitor of the present invention may be used in liquid or powder coatings, preferably liquid coatings.

Generally, the corrosion inhibitor described herein utilizes a combination of synergistic corrosion inhibiting mechanisms. The mixture of hydrotalcite with one or more corrosion inhibitors produces corrosion protection, which is more effective than the sum of each individual component acting separately. More specifically, the corrosion inhibitor utilizes the ion-exchange corrosion inhibiting mechanism of hydrotalcite or hydrotalcite-like compounds in combination with one or more of the corrosion inhibiting mechanisms of non-toxic organic or inorganic corrosion inhibitors, including but not limited to anodic and cathodic inhibition mechanisms. The first corrosion inhibiting mechanism, provided by hydrotalcite or a hydrotalcite-like compound, effectively scavenges corrosive ions, and in turn releases inhibitive ions such as carbonate. The released ions maintain a high pH in the coating and also mitigate the corrosion of the substrate. The chemical structure of hydrotalcite allows it to easily exchange anions.

The second corrosion inhibiting mechanism comprises one or more anodic passivating, cathodic inhibiting and/or film forming mechanisms, each of which may be derived from inorganic and/or organic corrosion inhibitive compounds. These inhibitive organic and inorganic compounds include, for example, but are not limited to, an anodic passivator such as borate, phosphate, silicate, molybdate, carboxylic acid, filming amine, sulfonate or phosphonate, and/or a cathodic inhibitor, such as hydroxide or polyphosphate constituent that can chemically adsorb onto the surface of the metal forming an impenetrable barrier that prevents corrosive ions from reaching the substrate.

As described above, an anodic inhibitor is an organic or inorganic substance that prevents dissolution of metal through oxidation. A cathodic inhibitor is an organic or inorganic substance that stifles the reduction (cathodic) process, which counterbalances the anodic reaction. A film formation inhibitor is an organic or inorganic substance that restricts corrosive ions from reaching a metal substrate. Corrosion is a combination of both anodic and cathodic reactions. The combination of, or synergism between, the ion exchange inhibitive mechanism of hydrotalcite or a hydrotalcite like material and one or more of these corrosion-inhibiting mechanisms is more effective than with only one mechanism alone.

The synergistic corrosion inhibitor uses a mixture of a first complexing agent and a second complexing agent to form the corrosion inhibitor. More specifically, the synergistic corrosion inhibitor uses a mixture of hydrotalcite as the first complexing agent and an organic or inorganic compound or compounds as the second complexing agent. The second complexing agent may be one or more of an organic compound corrosion inhibitor and/or an inorganic compound or a combination of both which demonstrates corrosion inhibitive properties.

In general, the synergistic corrosion inhibitor uses a mixture of, approximately 1-99% (preferably, approximately 1-25%) by total formula weight hydrotalcite, and approximately 1-99% (preferably, approximately 75-99%) by total formula weight of an inorganic corrosion inhibitor. Preferably, the reaction is carried out in approximately 30-75% by total formula weight water but there is no water in the final product.

Alternatively, in general, the synergistic corrosion inhibitor uses a mixture of approximately 1-99.9% (preferably, approximately 90-99.9%) by total formula weight hydrotalcite and approximately 0.1-99% (preferably, approximately 0.1-10%) by total formula weight of an organic corrosion inhibitor. Preferably, the reaction is carried out in approximately 30-75% by total formula weight water but there is no water in the final product.

One or more organic and/or inorganic corrosion inhibitors may be used in the above examples. For example, one or more organic corrosion inhibitors, one or more inorganic corrosion inhibitors, or one or more organic corrosion inhibitors and one or more inorganic corrosion inhibitors may be used. A hydrotalcite like material may also be used in place of hydrotalcite.

Thus, alternatively, in general, the synergistic corrosion inhibitor uses a mixture of, approximately 1-99% (preferably, approximately 90-99.9%) by total formula weight hydrotalcite, approximately 0.5%-49.5% (preferably, approximately 5.0-49.95%) by total formula weight of an inorganic (or organic) corrosion inhibitor, approximately 0.5-49.5% (preferably, approximately 5.0-49.95%) by total formula weight of an organic (or inorganic) corrosion inhibitor. Preferably, the reaction is carried out in 30-75% by total formula weight water but there is no water in the final product.

In a preferred example, a non-toxic, non-heavy metal inorganic phosphorus-based corrosion inhibitor (for example, calcium phosphate) is prepared by reacting in water (approximately 60% by total formula weight) a calcium salt (approximately 19% by total formula weight), for example carbonate, oxide or hydroxide, with phosphoric acid (approximately 14% by total formula weight). A hydrotalcite material (approximately 7% by total formula weight) is added to the calcium phosphate slurry. This reaction is performed in water inside a mixing vessel. The resultant wet slurry is dried and milled to yield the final product, calcium phosphate hydrotalcite, with a particle size which can easily be dispersed into paint. Non-heavy metals, such as calcium, are preferable because they are generally non-toxic and environmentally friendly.

In an alternate embodiment, hydrotalcite at 90-99.9% by total formula weight is combined with or surface treated with an organic inhibitor such as an amino carboxylate at approximately 0.1-10% by total formula weight. This can be done in any of at least the following three ways. The organic inhibitor can be added in dry form into the hydrotalcite slurry followed by drying and milling. Alternatively, the organic inhibitor can be post-added as a liquid into the hydrotalcite slurry followed by drying and milling. In addition, the organic inhibitor can be directly sprayed as a liquid onto the pre-milled hydrotalcite itself. In all of these cases, the organic inhibitor is chemically adsorbed on the surface of the hydrotalcite. The resulting product is a corrosion inhibitor comprising an organically modified hydrotalcite, namely amino carboxylate hydrotalcite.

It is to be understood of course that alternate embodiments can modify or change the concentrations, by total formula weight contributions or species from the general chemical group genre of the foregoing without changing the true scope and spirit of the present invention.

For example, a first complexing agent comprises hydrotalcite $(Mg_{2x}Al_2(OH)_{4x+4}CO_3 \cdot nH_2O)$ or a hydrotalcite-like material. A second complexing agent comprises an organic or inorganic compound. In the case of an inorganic compound, the second complexing agent may comprise a phosphorus compound, an acid, and an alkali metal, alkaline earth metal, or transition metal. For example, the second complexing agent may comprise phosphoric acid and either aluminum, magnesium, barium, strontium, molybdenum, calcium, or zinc. In the case of an organic compound, the second complexing agent may comprise amino carboxylate, organic acid, sulfonate or phosphonate. Examples of suitable second complexing agents include, but are not limited to, phosphate, phosphites, silicate, phosphosilicate, borate, borosilicate, borophosphate, molybdate, organic acid, organic sulfonate, organic phosphonate, alkyl amine, polyphosphate and amino carboxylate.

In general, the resultant corrosion inhibitive pigment is dispersed into a conventional paint during the grind phase, and comprises approximately 1-40% by total formula weight of the conventional paint, preferably 3-15% by total formula weight of the conventional paint.

The resultant corrosion inhibitive additive may be incorporated into any paint, including primer/topcoat, direct to metal and thin film coatings. The resultant corrosion inhibitive pigment is only slightly water-soluble and is preferably a solid pigment, which may be incorporated into a coating, preferably by high-speed dispersion, as is known in the art. The resultant coating composition is then applied at a desired dry film thickness to a metal substrate.

The coating composition may contain a film-forming binder (also known as the resin, carrier or vehicle) (for example, but not limited to, alkyd, acrylic, epoxy, polyester, polyamide, polyurea, polyurethane or hybrid resins of the above). The corrosion inhibitive pigment can be incorporated into such resin composition to form a film on the surface to which it is applied. The coating may or may not be subsequently top-coated. The inhibitor provides optimum corrosion protection in both salt and/or acidic corrosive environments.

The synergistic corrosion inhibitor thus significantly reduces the level of corrosive ions that reach the surface of the base metal, by improving the barrier property (impermeability to moisture) of the coating, reducing pores in the film by depositing insoluble carbonate or metal oxides, and by passivating the surface of the base metal. The present invention overcomes the limitations of known non-toxic corrosion inhibitors which rely on a single mode of action, and provides a superior level of corrosion resistance compared to known non-toxic corrosion inhibitors.

The synergistic corrosion inhibitor can be better illustrated with the following examples, which are intended to further explain, and not to limit, the invention. The following examples illustrate examples of synergistic corrosion inhibitors and mixtures thereof.

TABLE 1

Examples of Synergistic Corrosion Inhibitors

| EXAMPLE | CORROSION INHIBITOR | INHIBITOR TYPE | INHIBITIVE MECHANISM |
|---|---|---|---|
| 1 | Zinc Phosphate/ Hydrotalcite | Inorganic/Inorganic | Anodic/ Ion Exchange |
| 2 | Calcium phosphate/ Hydrotalcite | Inorganic/Inorganic | Anodic/ Ion Exchange |
| 3 | Aminocarboxylate/ Hydrotalcite | Organic/Inorganic | Anodic, Film Forming/ Ion Exchange |
| 4 | Organic Acid/ Hydrotalcite | Organic/Inorganic | Anodic/ Ion Exchange |
| 5 | Calcium Barium Borophosphate/ Hydrotacite | Inorganic/Inorganic | Anodic/ Ion Exchange |

EXAMPLE 1

An aqueous corrosion inhibitor is created by filling a mixer with approximately 30-75% by total formula weight of water at a temperature between approximately 18-50° C., adding approximately 10-30% by total formula weight of zinc oxide, and then adding approximately 10-30% by total formula weight of phosphoric acid (approximately 75% concentration) to form zinc phosphate. Approximately 1%-95% by total formula weight of hydrotalcite, $Mg_{2x}Al_2(OH)_{4x+4}CO_3 \cdot nH_2O$, with a surface area of approximately 10-400 $m^2/g$ is then added. (The higher the surface area, the greater the ion-exchange capacity of the hydrotalcite, the better the corrosion inhibition.) The batch in the mixer is then allowed to mix for approximately ten (10) minutes. The resultant wet slurry is then dried and milled (for example, in an attrition mill) to an average particle size of approximately 1.0-3.0 microns. The corrosion inhibitive pigment created by this process can then be incorporated into a paint.

EXAMPLE 2

The same procedure as described in Example 1 is performed, but with the substitution of approximately 10-30% by total formula weight calcium hydroxide instead of zinc oxide. The corrosion inhibitive pigment created by this process can then be incorporated into a paint.

EXAMPLE 3

The dry hydrotalcite corrosion inhibitive pigment described in Example 1 is placed in a dry bead-milling vessel at approximately 90 to 99.5% by total formula weight. Then approximately 0.5-10% by total formula weight of an amino carboxylate (commercially sold as HALOX® 510) is added into the milling vessel. The vessel is sealed and the material milled for approximately 30-60 minutes. The corrosion inhibitive pigment is then separated from the milling media and can then be incorporated into a paint.

EXAMPLE 4

The dry hydrotalcite pigment described in Example 1 and an organic acid pigment (commercially sold as HALOX® 650) are placed in a dry milling vessel at approximately 50-95% and 5-50% by total formula weight ratio, respectively. The corrosion inhibitive pigment is then dry-blended and milled for approximately 30 minutes, and then separated from the milling media prior to incorporation into a paint.

EXAMPLE 5

A dry blend of the hydrotalcite pigment described in Example 1 and calcium barium borophosphate (a corrosion inhibitor commercially available as HALOX Coil-X® 100) comprising approximately 50-90% by total formula weight are placed together in a dry milling vessel for approximately 30-60 minutes, the hydrotalcite making up approximately 10-50% by total formula weight of the combined pigments. The resultant product may then be incorporated into a paint.

Referring now to an analysis of the performance of the synergistic corrosion inhibitor, the resultant corrosion inhibitor of Example 2 was incorporated into a paint and the paint analyzed for physical properties. The inhibitor created in Example 2 was uniformly dispersed by means of high-speed dispersion using a cowles blade into the high performance water-based acrylic metal primer paint shown in Table 2 below. Only those paints which achieved a 5+ Northern Standard Hegman grind or greater were qualified for further evaluation of physical properties. Hegman NS is a tool used to determine the uniformity of pigment dispersion in paint. A high Hegman value indicates smaller particles and better dispersion.

TABLE 2

Water-Based Acrylic Metal Primer Based on a General Industrial Maintenance Primer

| Materials | Lbs/100 gal | % Weight | Description |
|---|---|---|---|
| Grind Phase | | | |
| Propylene Glycol | 39.78 | 3.62 | |
| Water | 104.59 | 9.53 | |
| Tamol 165A | 18.13 | 1.65 | Dispersant |
| Ammonia (28%) | 1.03 | 0.09 | |
| Triton CF-10 | 2.07 | 0.19 | Surfactant |
| Tego Foamex 1488 | 1.54 | 0.14 | Defoamer |
| Bayferrox 130M | 76.65 | 6.98 | Red Iron Oxide |
| Example # 2 | 54.90 | 5.00 | Corrosion Inhibitor |
| Atomite | 208.57 | 18.99 | Calcium Carbonate |
| Letdown Phase | | | |
| Rhoplex WL-100 | 460.92 | 41.98 | Resin |
| Water | 1.98 | 0.18 | |
| Ammonia (28%) | 1.0 | 0.09 | |
| Dowanol DPnB | 46.46 | 4.23 | Cosolvent |
| Dibutyl Phthalate | 23.23 | 2.12 | Plasticizer |
| Tego Foamex 1488 | 1.04 | 0.09 | Defoamer |
| HALOX FLASH-X 150 | 5.51 | 0.50 | Flash Rust Inhibitor |
| Acrysol RM 8W | 3.09 | 0.28 | Rheology Modifier |
| Water to adjust viscosity | 26.88 | 2.45 | |
| Totals | 1098.04 | 100 | |

As illustrated in Table 2, the synergistic corrosion inhibitor of Example 2 was incorporated into a standard water-based acrylic metal primer, particularly a general industrial maintenance primer commercially available as Rhoplex WL-100 at 5% on total formula weight. The paint shown in Table 2 was applied to a minimum of three dull matte finish cold rolled steel panels (R-48, 0.032"×4"×8") for each accelerated corrosion test using a 0.004 and 0.005 bird bar applicator for a dry film thickness (DFT) of approximately 2.5±0.3 mils (62.5 microns). Then the coated panels were allowed to air dry at room temperature for seven (7) days, before subjecting the panels to accelerated tests. The panels were scribed using a scribe machine, then tested for physical properties, including Salt Spray (ASTM B-117), Prohesion testing (ASTM G-85 A5), QCT Humidity (ASTM D-4585), and Electrochemical Impedance Spectroscopy (EIS). All paint systems were tested until obvious or discernible differences in the corrosion performance of the panels were observed. The panels were then rated for the degree of corrosion according to the following ASTM (American Society for Testing and Materials) methods shown in Table 3:

TABLE 3

ASTM Rating Methods

| Examined Area | ASTM Rating Method |
| --- | --- |
| Panel Corrosion | D 610-85 |
| Scribe Corrosion | D 1654-79A |
| Panel/Scribe Blister | D 714-87 |

The overall rating for these methods is based on a scale of 1-10, with 10 indicating the highest level of corrosion resistance and 1 being the lowest level of corrosion resistance. A qualitative measurement system was used in addition, rating corrosion as severe (NR), dense (D), medium dense (MD), medium (M), few (F), and very few (VF).

The test results from Salt Spray, Prohesion, and QCT (or Cleveland Condensing Cabinet) Humidity, Stability and Electrochemical Impedance testing are presented below in Tables 4-8, respectively. Tables 4-8 compare the inhibitor of Example 2 to other commercially available non-toxic corrosion inhibitors, as well as a blank (no inhibitor).

Table 4 is a tabulation of the degree of long-term salt spray corrosion measurements on cold rolled steel substrates using salt spray protocol ASTM accelerated test method B-117, for a period of 336 hours. Table 4 lists measurements for the dry film thickness (DFT), panel blistering, panel corrosion and scribe, as well as an overall rating. Salt spray corrosion was evaluated according to a qualitative measurement system rating corrosion as severe (NR), dense (D), medium dense (MD), medium (M), few (F), very few (VF) and a number system ranging from 10, best, to 1, worst.

TABLE 4

Salt Spray Data for Rhoplex WL-100 Acrylic Resin

| Primer Only Inhibitor | ASTM B-117 Salt Spray Testing - 336 hours | | | |
| --- | --- | --- | --- | --- |
| Loading Level (% weight) | DFT (mils) | Panel Blister | Panel Corrosion | Scribe Corrosion | Overall Rating |
| Blank/No Inhibitor | 2.35 | 8D | 1 | 3/90%, 8D | 2 |
| Zinc Molybdenum Phosphate @ 7% | 2.62 | 8MD | 3 | 7-5/25%, 8D | 5 |
| Zinc Phosphate @ 7% | 2.56 | 8D | 0 | 7/100%, 8D | 0 |
| Calcium Phosphosilicate @ 7% | 2.47 | 8MD | 4 | 7-5/50%, 8D | 5 |
| Example # 2 @ 5% | 2.55 | 8M | 6 | 9-6/50%, 6M | 9 |

Blank/No Inhibitor = No corrosion inhibitor in paint
Zinc Molybdenum phosphate = Inorganic non-toxic, heavy metal corrosion inhibitor (Commercially sold as HEUCOPHOS ZMP)
Zinc Phosphate = Inorganic non-toxic, heavy metal corrosion inhibitor (Commercially sold as HALOX ® Zinc Phosphate)
Calcium Phosphosilicate = Inorganic non-toxic, non-heavy metal corrosion inhibitor (Commercially sold as HALOX ® CW-491)

As can be seen from Table 4, the corrosion inhibitor of Example 2 demonstrates superior salt spray corrosion protection compared to known non-toxic corrosion inhibitors and a blank control.

Table 5 is a tabulation of the degree of corrosion based on Prohesion/QUV cycling measurements on cold rolled steel substrates which were rotated from one week of QUV exposure (168 hours) to one week of Prohesion exposure (168 hours) testing. The test was run for 1008 hours or three (3) complete cycles. One complete cycle equates to 336 hours. Table 5 compares the corrosion inhibitor of Example 2 to other commercially available non-chromate based, non-toxic corrosion inhibitors, as well as a blank. The test panels were evaluated for dry film thickness, panel blistering, panel corrosion and undercutting the scribe (scribe corrosion), as well as an overall rating, according to a qualitative method for measuring corrosion as severe (NR), dense (D), medium dense (MD), medium (M), few (F), very few (VF) and rating from 1, worst, to 10, best. The Prohesion/QUV test is a modified salt fog cabinet described in ASTM G-85 (Annex 5). The Prohesion/QUV test incorporates UV/condensation cycles with wet/dry salt-spray cycles to mimic the environment the coating is subjected to in an industrial setting.

TABLE 5

Prohesion Data for Rhoplex WL-100 Acrylic Resin

| Primer Only Inhibitor | ASTM G-85 A5 Prohesion Testing - 1008 hours | | | | |
| --- | --- | --- | --- | --- | --- |
| loading level (% weight) | DFT (mils) | Panel Blister | Panel Corrosion | Scribe Corrosion | Overall Rating |
| Blank/No Inhibitor | 2.55 | 4M | 4 | 6-4/25%, 4M | 3 |
| Zinc Molybdenum Phosphate @ 7% | 2.59 | 8M | 0 | 5-3/20%, 2F, 4MD | 2 |
| Zinc Phosphate @ 7% | 2.69 | 8MD | 0 | 7-5/75%, 4M, 6MD | 1 |
| Calcium Phosphosilicate @ 7% | 2.53 | 8F | 9 | 9-5/25%, 4MD | 7 |
| Example # 2 @ 5% | 2.65 | 8F | 8 | 7-6/75%, 6D | 8 |

Blank/No Inhibitor = No corrosion inhibitor in paint
Zinc Molybdenum phosphate = Inorganic non-toxic, heavy metal corrosion inhibitor (Commercially sold as HEUCOPHOS ZMP)
Zinc Phosphate = Inorganic non-toxic, heavy metal corrosion inhibitor (Commercially sold as HALOX ® Zinc Phosphate)
Calcium Phosphosilicate = Inorganic non-toxic, non-heavy metal corrosion inhibitor (Commercially sold as HALOX ® CW-491)

As can be seen from the results of Table 5, the corrosion inhibitor of Example 2 demonstrates superior prohesion corrosion protection compared to known non-toxic corrosion inhibitors and a blank control.

Table 6 is a tabulation of the humidity resistance on cold rolled steel substrates after 96 hours of curing, or allowing the coating to dry, measured every 24 hours. The Cleveland Condensing Cabinet (QCT) described in ASTM D-4585 is used to determine the moisture resistance of a coating exposed to high humidity. The coated side is exposed to water vapor heated from heated water maintained at 48° C. The non-coated side is exposed to the ambient temperature. This temperature difference forces condensation on the coated side. Poor humidity resistance causes the coating to blister and lose adhesion. Table 6 compares the inhibitor of the present invention to other commercially available non-toxic corrosion inhibitors, as well as a blank, using the same rating system as above.

TABLE 6

Humidity Data for Rhoplex WL-100 Acrylic Resin

| Primer Only | | ASTM D-4585 QCT (Humidity) Testing - 96 hours | | | |
|---|---|---|---|---|---|
| Inhibitor loading level (% weight) | DFT (mils) | 24 hrs | 48 hrs | 72 hrs | 96 hrs |
| Blank/No Inhibitor | 2.62 | 8VF | 8VF | 8VF | 8VF |
| Zinc Molybdenum Phosphate @ 7% | 2.78 | 8F | 8F | 8F | 8F |
| Zinc Phosphate @ 7% | 2.72 | 8F | 8F | 8F | 8F |
| Calcium Phosphosilicate @ 7% | 2.59 | 10 | 10 | 10 | 10 |
| Example # 2 @ 5% | 2.42 | 10 | 10 | 10 | 10 |

Blank/No Inhibitor = No corrosion inhibitor in paint
Zinc Molybdenum phosphate = Inorganic non-toxic, heavy metal corrosion inhibitor (Commercially sold as HEUCOPHOS ZMP)
Zinc Phosphate = Inorganic non-toxic, heavy metal corrosion inhibitor (Commercially sold as HALOX ® Zinc Phosphate)
Calcium Phosphosilicate = Inorganic non-toxic, non-heavy metal corrosion inhibitor (Commercially sold as HALOX ® CW-491)

As can be seen from Table 6, the corrosion inhibitor of the present invention (Example 2) demonstrates superior humidity resistance, and consequently superior corrosion protection, compared to known non-toxic corrosion inhibitors and a blank control.

Table 7 is a tabulation of the heat-age stability of the Rhoplex WL-100 acrylic-based paint, comparing Example 2 to other corrosion inhibitors, as well as a blank, measured after thirty days at 55° C. The viscosity was measured in Kreb units (KU) and high sheer viscosity (ICU).

TABLE 7

Stability Data for Rhoplex WL-100 Acrylic Resin

| Paint Formulation | | In Can Stability Testing - 30 days @ 55° C. | | |
|---|---|---|---|---|
| Inhibitor loading level (% weight) | | Initial Results | Final Results | Overall Change |
| Blank/No Inhibitor | pH | 8.72 | 8.80 | 0.08 |
| | KU | 84.4 | 72.8 | 11.6 |
| | ICI | 0.6 | 0.7 | 0.1 |
| Zinc Molybdenum Phosphate @ 7% | pH | 7.93 | Gelled | N/A |
| | KU | 94.1 | Gelled | N/A |
| | ICI | 0.7 | Gelled | N/A |
| Zinc Phosphate @ 9% | pH | 8.22 | 7.99 | 0.23 |
| | KU | 75 | 85.3 | 10.3 |
| | ICI | 0.7 | 1.2 | 0.5 |
| Calcium Phosphosilicate @ 7% | pH | 8.52 | 8.91 | 0.39 |
| | KU | 73.8 | 78.2 | 4.4 |
| | ICI | 0.9 | 1.4 | 0.5 |
| Example # 2 @ 5% | pH | 8.71 | 8.76 | 0.05 |
| | KU | 95.8 | 97.1 | 1.3 |
| | ICI | 0.7 | 1.4 | 0.7 |

Blank/No Inhibitor = No corrosion inhibitor in paint
Zinc Molybdenum phosphate = Inorganic non-toxic, heavy metal corrosion inhibitor (Commercially sold as HEUCOPHOS ZMP)
Zinc Phosphate = Inorganic non-toxic, heavy metal corrosion inhibitor (Commercially sold as HALOX ® Zinc Phosphate)
Calcium Phosphosilicate = Inorganic non-toxic, non-heavy metal corrosion inhibitor (Commercially sold as HALOX ® CW-491)

The inhibitor of the present invention exhibited better stability in the paint at room temperature and at 55° C. based on the overall change in low shear (KU) and high shear viscosity (ICI) measurements.

Table 8 is a tabulation of the electrochemical impedance spectroscopy (EIS) results comparing the inhibitor of Example 2 with other commercially available non-toxic and heavy metal-free corrosion inhibitors, as well as a blank. Impedance values were determined after allowing the coatings to cure for one (1) week followed by 168 hours of corrosion-inducing hydration in a 5% sodium chloride (NaCl) solution at ambient temperature. Impedance values, which are a measure of the coatings barrier properties, or resistance to the flow of electrical current, were determined in all cases on a solution-exposed area of 14.6 $cm^2 \pm 5\%$. The magnitude of the impedance is proportional to the insulating ability of the coating. A large impedance value therefore indicates that the coating has good barrier properties and is more corrosion-resistant because it impedes the flow of corrosive ions and moisture to the base metal.

TABLE 8

Electrochemical Impedance Data for Rhoplex WL-100 Acrylic Resin

| Paint Formulation | | Electrochemical Impedance after 168 hr of immersion | | |
|---|---|---|---|---|
| Inhibitor loading level (% weight) | DFT (mils) | Impedance, Z (ohm · $cm^2$) | | Ranking |
| Blank/No Inhibitor | 2.75 | 2.77E+02 | | 5 |
| Calcium Phosphosilicate (8%) | 2.75 | 3.76E+02 | | 3 |
| Calcium Polyphosphate (8%) | 2.75 | 2.83E+02 | | 4 |
| Calcium Ion Exchange Silica (5%) | 2.93 | 4.07E+02 | | 2 |
| Example # 2 (3%) | 2.65 | 1.94E+04 | | 1 |

Blank/No Inhibitor = No corrosion inhibitor in paint
Calcium Phosphosilicate = Inorganic non-toxic, non-heavy metal corrosion inhibitor (Commercially sold as HALOX ® CW-491)
Calcium Polyphosphate = Inorganic non-toxic, non-heavy metal corrosion inhibitor (Commercially sold as HEUCOPHOS CAPP)
Calcium Ion-Exchange Silica = Inorganic non-toxic, non-heavy metal corrosion inhibitor (Commercially sold as W. R. Grace Shieldex AC-5)

The corrosion inhibitor of Example 2 demonstrates significantly enhanced barrier properties compared to the blank control and the other commercially available non-toxic corrosion inhibitors.

Thus, the inhibitor composition of Example 2 showed improved corrosion resistance in the field and scribe area when compared to the blank control with no inhibitor and to other commercially available non-toxic corrosion inhibitors in the paint systems highlighted above. The corrosion inhibitor of Example # 2 was also more effective at lower loading level thus providing a cost benefit to the consumer. In addition, the inhibitor described in Example # 2 demonstrated excellent in can stability after 30 days at elevated temperatures. Lastly, the inhibitor of Example 2 produced coatings with the highest electrochemical impedance, while at the same time overcoming the disadvantages of the prior art corrosion inhibitors.

In summary, as can be seen from the salt spray resistance (Table 4), Prohesion corrosion resistance (Table 5), humidity resistance (Table 6), stability (Table 7) and electrochemical impedance (Table 8) test results, the synergistic corrosion inhibitors disclosed here produce highly favorable results, while at the same time overcoming the disadvantages of known prior art corrosion inhibitors. Such results are a significant improvement over known prior art corrosion inhibitors.

The foregoing specification describes only the preferred embodiment and alternate embodiments of the invention. Other embodiments besides the above may be articulated as well. The terms and expression therefore serve only to describe the invention by example only and not to limit the invention. It is expected that others will perceive differences, which while differing from the foregoing, do not depart from the spirit and scope of the invention herein described and claimed.

The invention claimed is:

1. A chemical composition that inhibits corrosion of metal substrates, said chemical composition comprising:
   a first complexing agent comprising hydrotalcite or a hydrotalcite-like material; and
   a second complexing agent comprising at least one corrosion inhibiting chemical compound;
   wherein the chemical composition is characterized by at least a first corrosion inhibiting mechanism and a second corrosion inhibiting mechanism; and
   wherein the at least one corrosion inhibiting chemical compound comprises at least one anodic passivator.

2. The composition of claim 1, wherein said second complexing agent comprises at least two corrosion inhibiting chemical compounds.

3. The composition of claim 1, wherein said at least one corrosion inhibiting chemical compound comprises an organic compound.

4. The composition of claim 1, wherein said at least one corrosion inhibiting chemical compound comprises an inorganic compound.

5. The composition of claim 1, wherein the at least one corrosion inhibiting chemical compound further comprises at least one cathodic inhibitor.

6. The composition of claim 1, wherein said at least one corrosion inhibiting chemical compound comprises at least one organic compound and at least one inorganic compound.

7. The composition of claim 4, wherein said inorganic compound is selected from the group consisting essentially of borate, phosphosilicate, borosilicate, borophosphate, inorganic acid, polyphosphate, phosphate, phosphite, silicate, molybdate, phosphonate, and hydroxide.

8. The composition of claim 1, wherein said at least one corrosion inhibiting chemical compound comprises a phosphorous compound.

9. The composition of claim 8, wherein said phosphorous compound is phosphoric acid.

10. The composition of claim 8, wherein said at least one corrosion inhibiting chemical compound further comprising a metallic compound.

11. The composition of claim 10, wherein said metallic compound is selected from the group consisting essentially of alkali metals, alkaline earth metals, transition metals, lanthanides, and actinides.

12. The composition of claim 10, wherein said metallic compound is selected from the group consisting essentially of sodium, calcium, iron, zinc, aluminum, magnesium, molybdenum, barium, cerium, and thallium.

13. The composition of claim 1, wherein said first complexing agent and said second complexing agent react to form a stable corrosion inhibiting compound.

14. A paint mixture, including the chemical composition in claim 1, that when applied to a metal substrate, inhibits corrosion of said metal.

15. A corrosion inhibiting coating product made by a process comprising the steps of:
   mixing hydrotalcite or a hydrotalcite-like material and at least one organic corrosion inhibiting compound comprising amino carboxylate or inorganic corrosion inhibiting compound comprising calcium barium borophosphate to form a corrosion inhibitor; and
   incorporating said corrosion inhibitor into a coating product.

16. A corrosion inhibitor made by a process comprising the steps of mixing together in water:
   hydrotalcite or a hydrotalcite-like material; and
   at least one organic corrosion inhibiting compound comprising amino carboxylate or inorganic corrosion inhibiting compound comprising calcium barium borophosphate.

17. A corrosion inhibiting chemical composition comprising:
   a hydrotalcite or hydrotalcite-like complexing agent; and
   at least one organic corrosion inhibiting compound, wherein the at least one organic corrosion inhibiting compound is an amino carboxylate;
   wherein said chemical composition is formed by reacting in water, 90-99.9% by total formula weight hydrotalcite or hydrotalcite-like material, and 0.1-10% by total formula weight organic corrosion inhibiting compound.

18. A corrosion inhibiting chemical composition comprising:
   a hydrotalcite or hydrotalcite-like complexing agent; and
   at least one inorganic corrosion inhibiting compound, wherein the at least one inorganic corrosion inhibiting compound is calcium barium borophosphate;
   wherein said chemical composition is formed by reacting in water, 1-25% by total formula weight hydrotalcite or hydrotalcite-like material, and 75-99% by total formula weight inorganic corrosion inhibiting compound.

19. A corrosion inhibiting chemical composition comprising:
   a hydrotalcite or hydrotalcite-like complexing agent;
   at least one inorganic corrosion inhibiting compound comprising calcium barium borophoshate; and
   at least one organic corrosion inhibiting compound comprising amino carboxylate;
   wherein said chemical composition is formed by reacting in water, 1-99% by total formula weight hydrotalcite or hydrotalcite-like material, 0.5-49.5% by total formula weight inorganic corrosion inhibiting compound, and 0.5-49.5% by total formula weight organic corrosion inhibiting compound.

20. A chemical composition that inhibits corrosion of metal substrates, said chemical composition comprising:
   a first complexing agent comprising hydrotalcite or a hydrotalcite-like material; and
   a second complexing agent comprising at least one corrosion inhibiting chemical compound;
   wherein said at least one corrosion inhibiting chemical compound comprises an organic compound;
   wherein said organic compound is aminocarboxylate.

21. The chemical composition of claim 1, wherein the first corrosion inhibiting mechanism effectively scavenges corrosive ions, and releases inhibitive ions.

22. The chemical composition of claim 1, wherein the second corrosion inhibiting mechanism comprises at least one of anodic passivating, cathodic inhibiting or film forming mechanisms.

23. A chemical composition that inhibits corrosion of metal substrates, said chemical composition comprising:
   a first complexing agent comprising hydrotalcite or a hydrotalcite-like material; and
   a second complexing agent comprising at least one corrosion inhibiting chemical compound;
   wherein said at least one corrosion inhibiting chemical compound comprises an inorganic compound;
   wherein said inorganic compound is calcium barium borophosphate.

* * * * *